July 2, 1963

L. A. BIXBY 3,095,758

POWER TRANSMISSION

Filed Sept. 3, 1958

INVENTOR.
Leo A Bixby

BY
Strauch, Nolan & Neale
ATTORNEYS

INVENTOR.
Leo A. Bixby
BY
Strauch, Nolan + Neale
ATTORNEYS

United States Patent Office 3,095,758
Patented July 2, 1963

3,095,758
POWER TRANSMISSION
Leo A. Bixby, Niles, Mich., assignor to Rockwell-Standard Corporation, Coraopolis, Pa., a corporation of Pennsylvania
Filed Sept. 3, 1958, Ser. No. 758,822
9 Claims. (Cl. 74—701)

This invention relates to power transmissions for motor vehicles and is particularly concerned with a power dividing transfer case for a four or more wheel drive vehicle.

In multi-drive vehicles of the class to which this invention pertains it is known to drive both the front and rear axles from the main transmission through an intermediate system of gearing such as a transfer case incorporating conventional differential gearing to differentiate in speed between front and rear axles. In addition, usually means is provided to disconnect the drive to the front axle when such is not needed.

This conventional power transmission system possesses serious drawbacks in regard to economical operation of the vehicle. For instance the front axle drive is disconnected most of the time, only being occasionally connected to help the vehicle up a hill or over a hump, so that the rear tires which do most of the driving wear out sooner than the front tires and accordingly have to be replaced more frequently. Furthermore, uneven wear on the tires results in traction differences, making the vehicle unsafe to operate on slippery road surfaces. Another disadvantage lies in the inherent insufficiency of any conventional differential. In a truck the driven rear axle or axles are usually more heavily loaded than the front axle and therefore less likely to slip. To prevent spinning of the front wheels when the front drive is connected, as may be necessary to help the vehicle over a hump, the differential may be provided with a lock to prevent drive differentiating between the front and rear axles. But even so, the front wheels might slip by reason of the heavier load on the rear axle and the even distribution of torque between front and rear axles. Torque dividers have been proposed to divide the output torque in such proportion that at all times sufficient torque is applied to the rear axle and relatively lesser torque to the front axle. Employing a customary torque divider rules out the use of a conventional differential which tends to divide the torque equally. The present invention contemplates a novel torque divider differential arrangement.

Unequal torque dividing differentials have been known but the present invention provides for the first time a unit comprising a simple transfer case of the drop-box type incorporating a planetary torque dividing interaxial differential which divides the torque such that about ⅓ is delivered to the front axle and about ⅔ to the rear axle, which unit can be easily installed or removed from the transfer case.

The present invention therefore provides a universal transfer case unit with a detachable planetary torque dividing differential which, when installed, provides drive to both front and rear axles at all times, applying more power to the rear axle than to the front axle and consequently enhancing and equalizing the tire wear on the rear tires. Power is a function of torque multiplied by angular speed.

It is a primary object of the present invention to provide a novel transfer case for a multi-drive axle vehicle to drive both front and rear axles at all times through a planetary torque dividing differential which may be detachable to convert to a simple drop-box type transfer case having a declutching means for the front axle to drive the front axle only occasionally as conditions warranted.

It is another object of the present invention to provide in a novel transfer case an enlarged front cover for the front output shaft to optionally install a declutching device.

A further object of the present invention is the provision of a sliding clutch in a planetary torque dividing differential for a novel transfer case to lock the differential under adverse road conditions when traction is unequal.

Still another object of the present invention resides in the provision of a special rear cover for the rear output shaft of a novel transfer case such as to provide for mounting a transmission brake on the rear output shaft.

A still further object of the present invention is the provision of a novel planetary torque dividing interaxial differential in combination with a transfer case to divide the driving torque such that about ⅓ is applied to the front axle and about ⅔ to the rear axle for giving the vehicle optimum traction at all times and equalizing tire wear.

Other objects and novel features will become apparent from the following description taken in connection with the annexed claims and the appended drawings in which:

Figure 1:
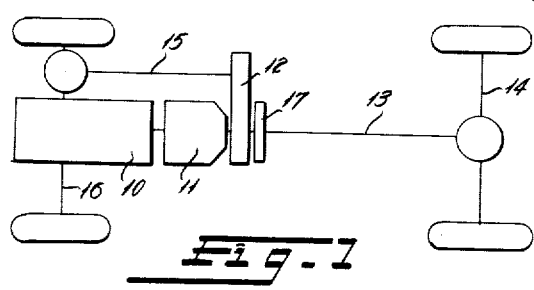
FIGURE 1 is a schematic view of a four wheel drive vehicle in which the invention is incorporated.

FIGURE 1 shows a road vehicle of a 4 x 4 type, that is all four wheels of the front and rear axles may be driven, comprising an engine 10 from which power is delivered to a conventional multi-change speed transmission 11 to the output shaft of which is connected a transfer case 12 to transmit driving power by means of a rear propeller shaft 13 to the rear drive axle 14 and front propeller shaft 15 to the front steer drive axle 16. A brake 17 may be attached to the rear propeller shaft 13 at the back of transfer case 12. Both axles are supported at opposite ends by ground-engaging wheels.

This vehicle may be considered a freight-carrying over-the-road truck or tractor which is usually equipped with a large range of speed changes in the transmission to meet nearly every road condition, especially in hilly areas. The front axle drive is usually employed only to get a pulling force on the truck to assist the rear drive axles on wet roads or in climbing a hill. The front drive is achieved by attaching the transfer case, preferably a plain drop-box type case, adjacent the rear of the transmission, the front output shaft of the transfer case being provided with a declutching mechanism to declutch the front axle drive when this drive is not needed. Past experience has shown, however, that it may be desirable to drive the front axle at all times to lessen the friction load on the rear tires to prevent them from becoming worn out faster than the front tires and being replaced more frequently. To achieve a satisfactory full time drive to the front axle an interaxial differential is incorporated into the transfer case to provide the necessary differentiating action between the two axles, and a unit providing a ⅓ and ⅔ dividing proportion has been found satisfactory. This proportioned differential power dividing action in connection with a transfer case is accomplished by the present invention and is described hereinafter in details for a preferred construction.

Figure 2:
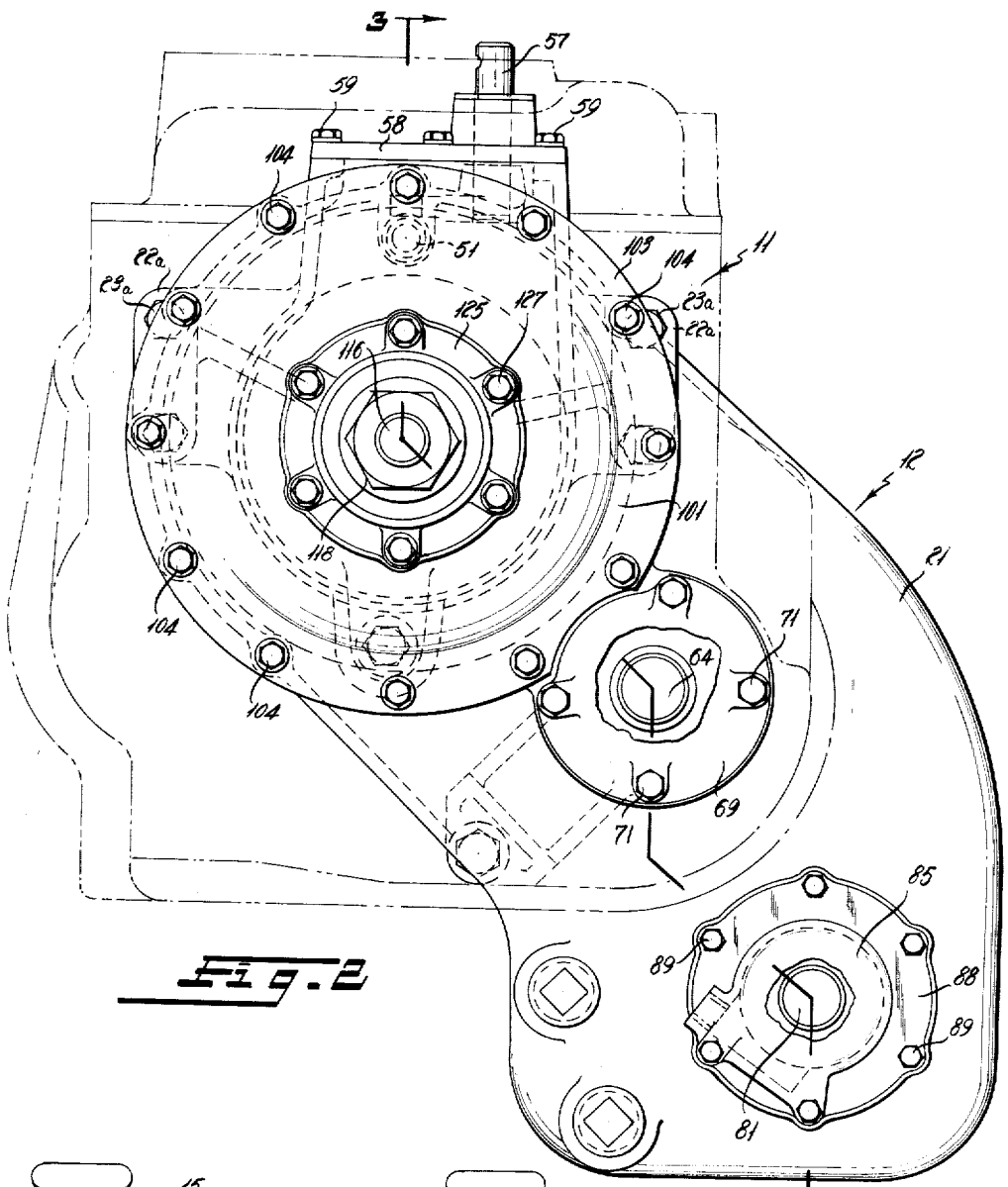
FIGURE 2 is a rear elevation of a drop-box type transfer case according to a preferred embodiment of the invention.
Figure 3:
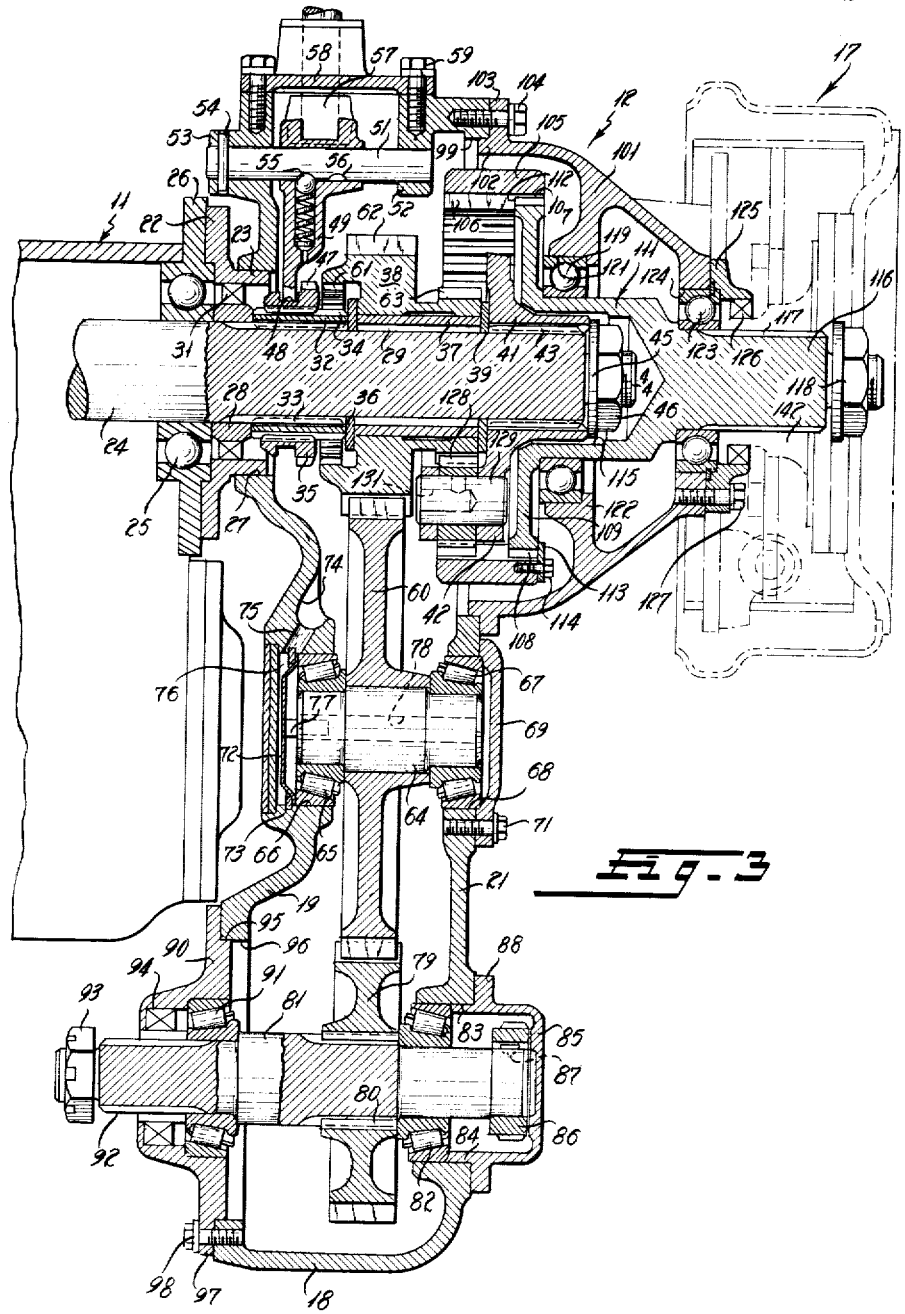
FIGURE 3 is a cross section through the transfer case of FIGURE 2 essentially along line 3—3.

FIGURES 2 and 3 show the rear of the drop-box type transfer case unit 12 as attached directly to change speed transmission 11 shown in phantom lines. Transfer case 12 comprises an oblong integral hollow housing 18 having a front wall 19 and rear wall 21. Housing 18 is secured removably to the rear end of the transmission housing by means of bolts or the like (not shown) extending through flange 22 of an adapter 23 and by two oppositely extending yoke flanges 22a integral with front wall 19 bolted to the rear of transmission housing 11 by means of bolts 23a (FIGURE 2). The transmission output shaft 24 is rotatively supported in a bearing 25 mounted in an aperture of rear housing wall 26 of transmission 11. Adapter 23 extends into an aperture 27 in front wall 19 of housing 18 and shaft 24 extends through adapter 23 into the interior of housing 18 where it serves as the input shaft to the transfer case. The end of shaft 24 within transfer case housing 18 is longitudinally splined at 29 and an annular spacer 28 surrounds the shaft at the front end of the splines. An oil seal 31 between spacer 28 and adapter 23 prevents oil flow from the transmission 11 into transfer case 12.

Inwardly of spacer 28, which abuts the inner race of bearing 25, are in longitudinal succession a collar 32 which is internally splined to shaft 24 at 33 and has external longitudinal splines 34 for axially slidably mounting a splined clutch member 35, an annular flat retainer ring 36, a bearing sleeve 37 on which is journalled a compound gear 38, an annular flat retainer ring 39, and the hub 41 of a planet gear carrier 42 internally splined at 43 to shaft 24. Shaft 24 terminates in a threaded reduced section 44 on which is disposed a retaining washer 45 and a nut 46.

Spacer 28, collar 32, washer 36, sleeve 37, washer 39 and hub 41 are axially clamped between the inner race of bearing 25 and washer 45 by tightening nut 46 in threaded reduced section 44 of shaft 24.

Clutch member 35 is provided at one end with a row of external teeth 47, and an intermediate section of clutch member 35 is formed circumferentially with a recess 48 to receive the bifurcated end of a shift fork 49 slidingly secured to a stationary rail 51 in the upper section of housing 18. Rail 51 extends between an integral inwardly extending flange 52 and an outward boss-like extension 53 of front wall 19 where it is non-rotatably secured as by a pin 54. The enlarged upper section of shift fork 49 receives a spring loaded ball assembly 55 adapted to detent with either of two notches 56 in rail 51 to hold clutch member in either of its two shifted positions, the latter being selected by any convenient and well known shifting mechanism 57. The shift fork assembly is easily accessible by removing a top wall cover 58 secured as by bolts 59 to housing 18.

Teeth 47 of slidable clutch member 35 are adapted to shift from the disengaged position of FIGURE 3 into mesh with a row of internal clutch teeth 61 at the end of gear 38. Compound gear 38 is composed of a large diameter gear 62 and a small diameter gear 63. Gear 63 is the sun gear of the planetary power dividing differential unit and will be described in connection therewith later. Gear 62 is in constant mesh with an intermediate gear 60 in the center section of the transfer case housing secured to a stub shaft 64 rotatably mounted at opposite ends in a tapered roller bearing 65 in an aperture 66 of front wall 19 and a similar bearing 67 in an aperture 68 in rear wall 21 of case 18. Shaft 64 is offset downwardly and laterally from shaft 24. A bearing cover 69 protects bearing 67 and is secured to the rear wall as by machine screws 71. Bearing 65 is protected by a covering shield 72 held against the outer race of bearing 65 by a retaining snap ring 73, and a flat cover therefor is press-fitted into the enlarged end of aperture 66. The housing wall is formed with an internal lubricant catching pocket 74 connected by passage 75, space 76 and conduit 77 to direct lubricant into hollow shaft bore 78 which discharges lubricant to the outer sides of bearings 65 and 67. This provides full lubrication of the shaft 64 bearings.

Gear 60 is in constant mesh with gear 79 splined at 80 to a front output shaft 81 in the lower part of housing 18 offset downwardly and laterally from both the intermediate gear shaft 64 and input shaft 24. Front output shaft 81 is mounted at its rear end in a tapered roller bearing 82 having its inner race abutting the hub of gear 79. The outer race of bearing 82 is supported in an aperture 83 of rear wall 21 and abuts the inner end of an axially inwardly extending flange 84 fitted into aperture 83 and providing a pilot of an auxiliary housing 85 containing a speedometer mechanism of which only a worm gear 86 is shown in FIGURE 3 as keyed at 87 to the end of shaft 81. Radial flange 88 of housing 85 is secured to the transfer case rear wall as by screws 89 (FIGURE 2).

The forward end of front output shaft 81 is supported in a similar tapered roller bearing 91 seated in a counterbore in cover 90. Shaft 81 is splined at 92 to accommodate mounting of a connection flange (not shown) to be secured thereto by nut 93 on the threaded shaft and to establish a drive connection with front propeller shaft 15 of FIGURE 1 which extends beneath and alongside main transmission 11 to the front drive axle 16. Shaft seal 94 is fitted into the aperture of retaining cover 90 outwardly of bearing 91 for coaction with the attached connection. Cover 90 is inwardly provided with a pilot shoulder at 95 to fit wall opening 96 and a radial flange 97 secured to the wall 19 as by screws 98. The enlarged aperture 96 in front wall 19 provides means to easily install a declutching mechanism for the front output if desired, but this is generally not necessary when the below described power-dividing differential unit is used.

Shaft 24 extends rearwardly through an enlarged aperture 99 in rear wall 21 of the transfer case. An auxiliary housing 101 has a pilot flange 102 fitting into aperture 99 and an integral radial flange 103 secured to the wall as by bolts 104. Auxiliary housing 101 contains the planetary differentiating unit of this embodiment of the invention comprising a radially floating ring gear 105. As shown in FIGURE 3 the internal ring gear teeth 106 are reduced at their outer ends at 107 to provide a spline connection with the external splines 108 on radial flange 109 of a ring gear hub 111. Splines 108 are axially confined between shoulder 112 and a retaining plate 113 secured to the ring gear as by cap screws 114. Ring gear 105 is free to float radially a small distance on its supporting splines to conform to the action of planetary pinions while in motion. Ring gear hub 111 has a hollow central portion providing a recess 115 into which partially protrudes the end of input shaft 24. The hub end portion is a shaft 116 splined at 117 and terminates in a threaded end to accommodate mounting of a connection flange (not shown) to be secured thereto by nut 118 to connect it to the rear propeller drive shaft 13 of FIGURE 1. Shaft 116 is concentric with shaft 24, and the axes of shafts 24, 64, 81 and 116 are parallel. Ring gear hub 111 is rotatively supported by an inner antifriction bearing 119 adjacent flange 109 mounted in aperture 121 of an inwardly extending integral auxiliary housing flange 122, and by an outer antifriction bearing 123 mounted in an aperture 124 of the rear wall of auxiliary housing 101. A bearing and seal retaining cover 125 mounting an oil seal 126 is secured to the rear wall of housing 101 as by screws 127 and completes the assembly of the rear output.

Planet carrier hub 41 projects into the recess 115 of the ring gear hub. Carrier 42 carries a number of planet pinions 128 (only one of which is shown in FIGURE 3) freely journalled on non-rotatable pins 129 formed with lubrication channels 131 to maintain ample lubrication of the pinion friction surfaces. Pins 129 are press fitted into apertures in carrier 42 and held axially by staked pins (not shown). Planet pinions 128 are in constant mesh with the internal teeth 106 of the ring gear and the teeth of the sun gear 63.

The arrangement and support of drive mechanism about shaft 24 minimizes the transfer of the load induced by the gearing of the transfer case to the rear bearing 25 of the transmission 11, thus making it possible for the transmission builder to design the rear end support of shaft 24 in transmission 11 by considering the load of the change speed transmission gearing only.

The invention provides a proportional front and rear axle drive with provision for differentiating between the front and rear axles. With the clutch teeth at 47 and 61 disengaged as shown in FIGURE 3, the drive to the front axle goes through input shaft 24, planet carrier 42, pinions 128, sun gear 63, gear 62, intermediate gear 60, gear 79 and shaft 81 to propeller shaft 15. The drive to the rear axle is accomplished through shaft 24, carrier 42, planet pinions 128, ring gear 105 and shaft 116 to the rear propeller shaft 13. The pitch ratio between sun gear 63 and ring gear 105 is such that ⅔ of the driving power is delivered to the rear axle and ⅓ to the front axle. Thus the present invention provides that at least ⅔ of the driving power is always available at the rear axle. The planetary power dividing unit provides also the desired differentiating action between the front and rear axles by the ability of the sun gear 63 and ring gear 105 to overrun and thereby effectively reverse the direction of rotation of the other gear respectively.

In cases where unequal traction exists, as on slippery surfaces, the planetary drive unit on shaft 24 can be locked to shaft 24 to prevent such differentiating by shifting the sliding clutch member 35 into mesh with the clutch teeth 61 of the compound gear 38. This locks gear 38 to input shaft 24 and effectively locks planet carrier 42 to shaft 24 so that shaft 24, gear 38, carrier 42, ring gear assembly 105, 111 and shaft 116 rotate as a unit about their common axis. In instances where it is desired to use a declutching mechanism on the front output shaft 81, it is necessary to lock the planetary unit to shaft 24 whenever the front axle drive is disconnected, to achieve a 100% rear output.

Auxiliary housing 101 is so constructed as to allow the mounting of a transmission brake assembly 17 for the rear output shaft 116 as shown by broken lines in FIGURE 3, but the brake itself or any part thereof do not constitute an inherent part of the present invention, therefore a detailed description of the brake and mounting is deemed unnecessary.

Figure 4:
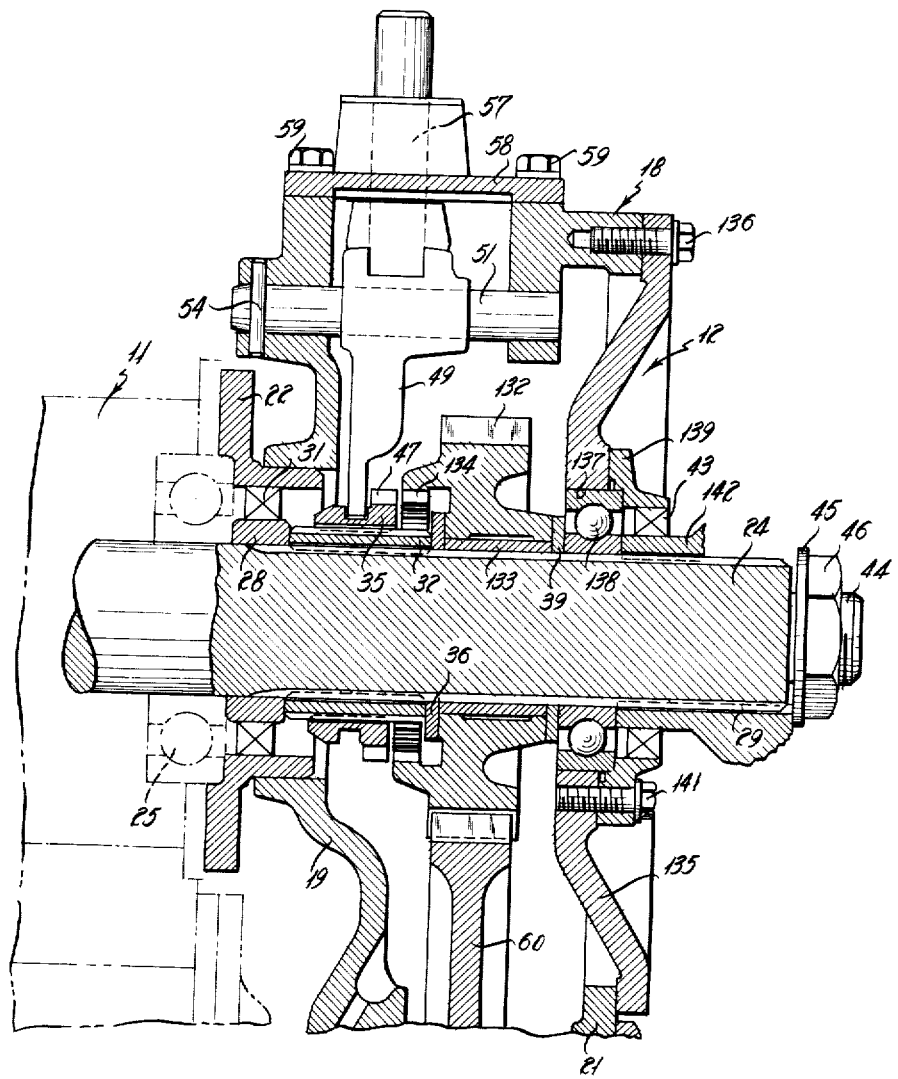
FIGURE 4 shows on an enlarged scale a modified upper section of the transfer case of FIGURE 3 with the differential unit detached and the same reference numerals refer to same parts throughout.

With reference now to FIGURE 4 there is shown a slightly modified version of the upper part of a transfer case according to the invention but wherein the power divider of FIGURES 2 and 3 is replaced by a direct drive. This can be done by converting the transfer case of FIGURE 3 to a single drop-box type by removing the auxiliary housing 101 including the entire planetary unit consisting of ring gear 105, ring gear hub 111, planet carrier 42 with planet pinions 128, bearings 119 and 123 and compound gear 38. This can be done by removing bolts 104, nut 46 and washers 36 and 39. Gear 38 and bearing sleeve 37 are replaced by a gear 132 journalled on a shorter bearing sleeve 133. Gear 132 is of the same size as gear 62 and has a row of clutch teeth 134 the same size as clutch teeth 61. Wall aperture 99 in this embodiment is closed by an inwardly depressed cover 135 secured to rear wall 21 as by bolts 136. Cover 135 is provided with a central aperture 137 to receive a bearing 138 to rotatively support the rear end of input shaft 24. Seal mounting cap 139 is secured to cover 135 as by bolts 141 which retain cap 139 in abutment with the outer race of bearing 138. Coupling 142 to propeller shaft 13 is splined onto the end of shaft 24 and surrounded by seal 143. When nut 46 is drawn tight it forces the inner race of bearing 138, retainer 39, annulus 133, retainer 36, collar 32 and spacer into tight axial assembly.

In the assembly of FIGURE 4, shaft 24 drives the rear propeller shaft 13 only, or may be clutched to gear 132 to also drive the front axle.

Thus the present invention provides a novel power dividing and differentiating transfer case to provide driving of the front drive axle of a multiwheel vehicle at all times without requiring the attention of the driver, and at the same time provide differentiating action between front and rear axle drive by the same unit. This is readily convertible into a direct drive unit as in FIGURE 4.

The present invention may be embodied in other specific forms without departing from the inherent characteristics thereof and its scope is interpreted by the appended claims rather than the foregoing description.

What is claimed and desired to be secured by United States Letters Patent is:

1. In a transfer case having a rear wall opening, a housing member removably secured over said opening, an input shaft, a coaxial first output shaft journalled on and extending rotatably through said housing member, a spaced parallel second output shaft, a planetary gear system contained by said housing member and comprising a carrier non-rotatably mounted on said input shaft said carrier mounting preventing axial movement of the carrier on said input shaft duing operation but permitting ready removal of the carrier from said input shaft, a sun gear journalled on said input shaft, a ring gear non-rotatably mounted on said first output shaft and rotatable pinions on said carrier meshed with said sun and ring gears, and a drive gear train constantly connecting said sun gear to said second output said ring gear and first output shaft being removable from the casing along with said housing member shaft.

2. In the transfer case defined in claim 1, means for clutching said sun gear to said input shaft.

3. In a transfer case for a vehicle having front and rear drive axles, a main casing having aligned front and rear wall openings, a rotatable input shaft projecting thereinto through said front wall opening and extending through said rear wall opening to terminate in a drive member mounting portion rearwardly outside of said casing rear wall, a first gear journalled on said input shaft, a row of clutch teeth on said gear, a clutch member slidable and non-rotatably mounted on said input shaft and having a row of clutch teeth adapted to mesh with said clutch teeth on the gear, an intermediate shaft journalled in said casing carrying a second gear meshed with said first gear, a front axle drive output shaft journalled in said casing carrying a third gear meshed with said second gear, means removably mounted on said mounting portion for coupling said input shaft for rear axle drive, and closure means for said rear wall opening surrounding said input shaft.

4. In the transfer case defined in claim 3, said closure means comprising a housing member removably secured on said casing, and said means coupling the input shaft for rear axle drive comprising a shaft section journalled on and extending rearwardly through said housing member and a planetary gearing assembly interconnecting said input shaft and said shaft section.

5. In the transfer case defined in claim 7, said closure means comprising a cover having a central opening mounting a bearing support for said input shaft axially inwardly of said drive member mounting portion.

6. In a transfer case for a vehicle having front and rear drive axles, a housing having front and rear wall apertues, an input shaft pojecting through the front wall aperture, a compound gear journalled on said input shaft consisting of a first gear and a sun gear, means for selectively clutching said shaft to said compound gear, a first output shaft coaxial with said input shaft, a planetary gear assembly including said sun gear connecting said input and first output shafts, a removable housing member secured over said rear wall aperture, said planetary gear assembly comprising a planet gear carrier removably mounted on said input shaft and a ring gear rigid with said first output shaft and journalled on said removable housing member, and said ring gear having a hollow hub surrounding the end of said input shaft and having a portion extending rearwardly through said removable housing member to serve as said first output shaft, a second output shaft journalled in spaced relation in said housing, a second gear on said second output shaft, and an intermediate gear journalled in the housing and meshed with both said first and second gears.

7. In a transfer case, a housing having front and rear wall apertures, an input shaft projecting through both apertures, a removably mounted cover for the rear wall aperture supporting a bearing in which said shaft is journalled, a first gear journalled on said shaft internally of said housing, means for selectively clutching said shaft to said first gear, a front axle drive shaft journalled in the lower end of said housing, a second gear on said front axle drive shaft, an intermediate gear journalled in said housing and meshed with said first and second gears, and means for coupling a rear axle propeller shaft to the end of said input shaft outside said housing cover.

8. In a transfer case having aligned front and rear wall openings, a housing member removably secured over said rear opening, an input shaft projecting through into the case through said front wall opening and out through said rear wall opening where it terminates in a splined portion providing a common means for removably mounting either the planet carrier of a differential assembly or a rear axle drive shaft coupling, a front axle drive output shaft journalled in said casing and carrying a gear, a gear journalled on said input shaft within the casing axially inwardly of said splined portion, constantly meshed idler gearing between said gears, means in the casing for selectively clutching said input shaft to the gear on said input shaft, and a common mounting means on said casing for selectively removably mounting over the rear wall opening of said casing either a housing wherein a rear axle drive output shaft and planetary ring gear assembly is rotatably mounted or a cover having a support bearing for said input shaft inwardly of said splined portion.

9. In a main transmission and transfer case assembly, a transmission housing, a transmission output shaft projecting from said transmission housing, a transfer case housing rigid with the transmission housing and having front and rear wall apertures through which project said transmission output shaft, said shaft being fixed against axial displacement, an auxiliary housing removably mounted over the rear wall aperture, a coaxial first transfer case output shaft journalled in said auxiliary housing, planetary gearing surrounded by said auxiliary housing drivingly connecting said shafts, said planetary gearing comprising a sun gear mounted for rotation upon said transmission output shaft, a ring gear carried by said transfer case output shaft, a planet gear carrier non-rotatably mounted on said transmission output shaft, and a plurality of planet gears rotatably mounted on said carrier and meshed with the sun and ring gears, a second transfer case output shaft journalled in the lower part of said transfer case housing below the level of said auxiliary housing and means including gearing within said transfer case housing drive connecting said sun gear to said second transfer case output shaft, said transfer case output shaft and ring gear being removable with said auxiliary housing.

References Cited in the file of this patent

UNITED STATES PATENTS

| 750,424 | Bard | Jan. 26, 1904 |
| 838,604 | Bard | Dec. 18, 1906 |
| 1,735,984 | Straussler | Nov. 19, 1929 |
| 2,064,262 | Keese | Dec. 15, 1936 |
| 2,066,873 | Barnes | Jan. 5, 1937 |
| 2,228,509 | Olen | Jan. 14, 1941 |
| 2,267,562 | Higgens | Dec. 23, 1941 |
| 2,312,263 | Ormsby | Feb. 23, 1943 |
| 2,574,986 | Schon | Nov. 13, 1951 |
| 2,853,899 | Graham et al. | Sept. 30, 1958 |
| 2,870,853 | Keese | Jan. 27, 1959 |
| 2,904,905 | Armington | Sept. 27, 1959 |

FOREIGN PATENTS

| 156,731 | Australia | May 25, 1954 |
| 726,227 | Great Britain | Mar. 16, 1955 |

UNITED STATES PATENT OFFICE
CERTIFICATE OF CORRECTION

Patent No. 3,095,758                          July 2, 1963

Leo A. Bixby

It is hereby certified that error appears in the above numbered patent requiring correction and that the said Letters Patent should read as corrected below.

Column 6, line 20, for "duing" read -- during --; lines 26 to 28, for "sun gear to said second output said ring gear and first output shaft being removable from the casing along with said housing member shaft" read -- sun gear to said second output shaft, said ring gear and first output shaft being removable from the casing along with said housing member --; column 6, line 56, for the claim reference numeral "7" read -- 3 --; line 62, for "apertues" read -- aperatures --; same line 62, for "pojecting" read -- projecting --; column 7, line 20, strike out "throught".

Signed and sealed this 21st day of April 1964.

(SEAL)
Attest:

ERNEST W. SWIDER

Attesting Officer

EDWARD J. BRENNER

Commissioner of Patents